Aug. 31, 1965   H. BLUMER   3,203,288
MACHINE FOR CUTTING AND/OR CREASING SHEETS OF THIN
MATERIALS SUCH AS PAPER AND CARDBOARD
AND METAL OR PLASTIC FOILS
Filed Nov. 21, 1960   4 Sheets-Sheet 4
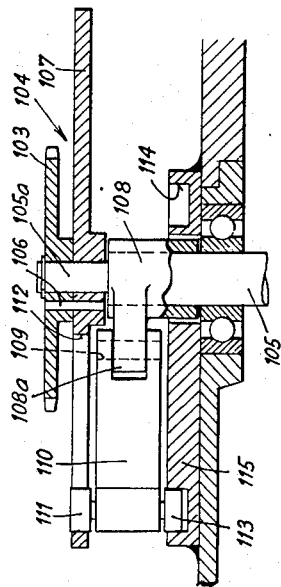
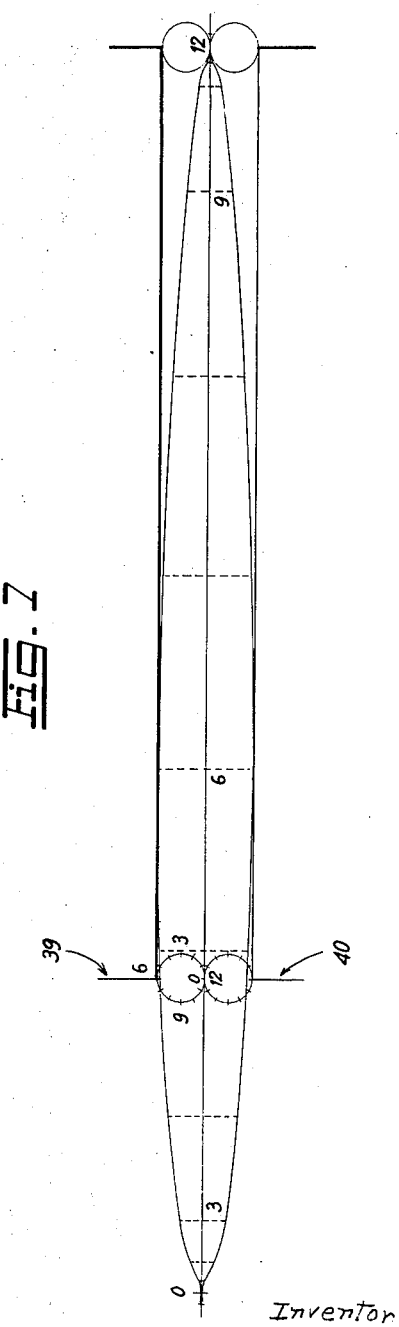
Inventor
Hans Blumer
By Stevens Davis Miller & Mosher
Attorneys

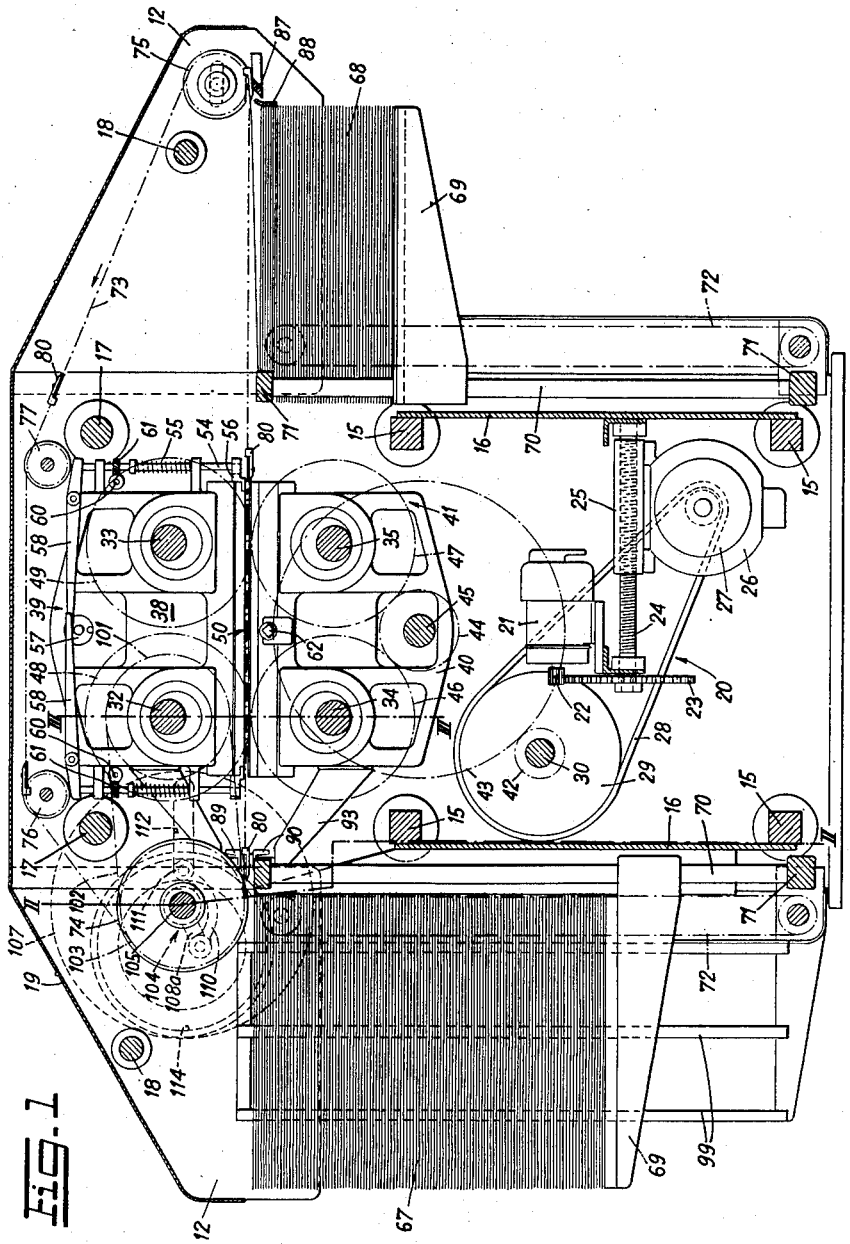

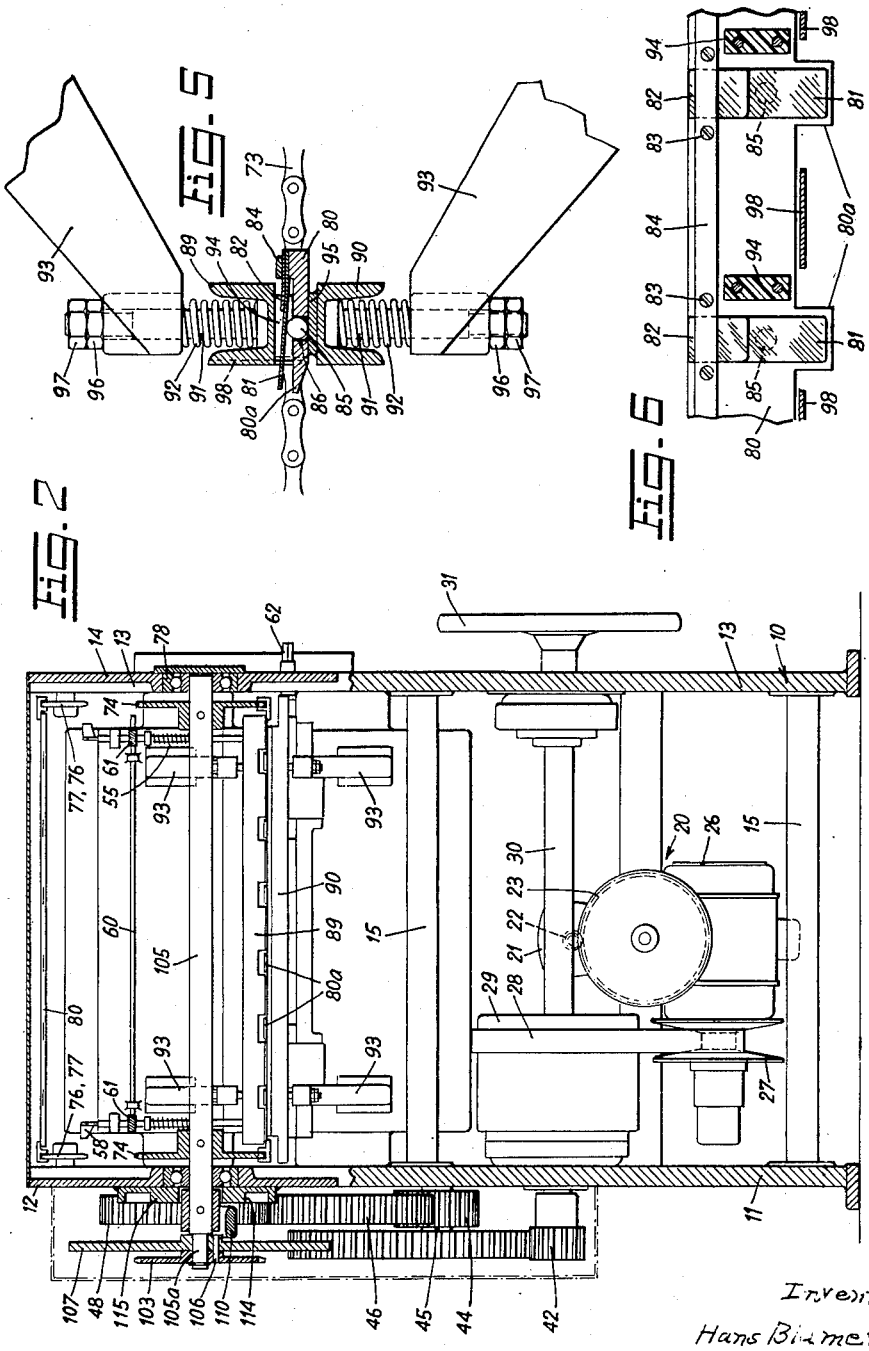

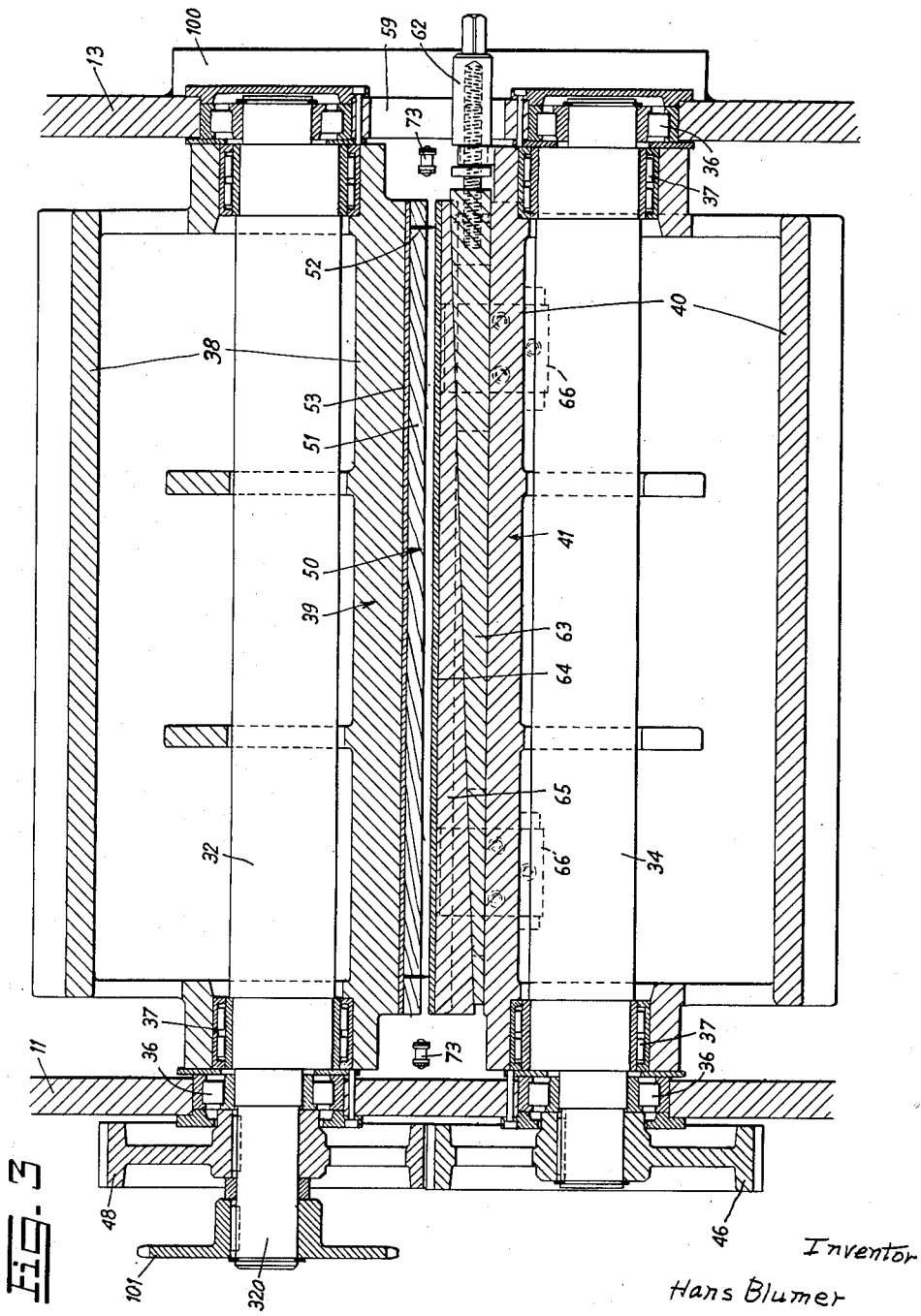

United States Patent Office 3,203,288
Patented Aug. 31, 1965

3,203,288
MACHINE FOR CUTTING AND/OR CREASING SHEETS OF THIN MATERIALS SUCH AS PAPER AND CARDBOARD AND METAL OR PLASTIC FOILS
Hans Blumer, Maschinenfabrik Leutschenbachstrasse 43, Zurich-Oerlikon, Switzerland
Filed Nov. 21, 1960, Ser. No. 70,583
Claims priority, application Switzerland, Nov. 27, 1959, 81,192
5 Claims. (Cl. 83—92)

The present invention relates to a machine for the cutting and/or creasing of sheets of thin material such as paper, cardboard and metal or plastic foils, having a tool holder unit and a die block unit and with means for moving these units towards and away from each other.

Such machines are used in large number in the packaging industry. They exist in different forms with modifications being continuously made to satisfy simultaneously different demands. Among such demands, mention may be made of high operating speed in order to achieve large capacity; the most accurate play-free guiding of the tool holder unit or of the die block unit, one of these units being in various cases made immovable; the greatest possible counteracting of the forces of mass inertia; etc. An additional problem in the construction of these machines is the conveying of the sheets to the cutting or creasing position and the subsequent removal of the sheets from this position, which position must be maintained with particular accuracy when preprinted sheets are being worked.

In accordance with the invention, the means which move the workholder unit and the die block unit have four eccentric shafts parallel to each other and arranged in pairs to support one or the other of these two units. In this way all means for the linear guiding of the two units which are of substantial mass, become superfluous. The supporting of the two units on the corresponding eccentric shafts and the supporting of the latter by means of anti-friction bearings in the machine housing, can be made with extremely small play and yet strong without structural difficulties (even with respect to the lubrication of the bearings).

The circumference of the cam circle of the eccentric shafts is preferably only a fraction of the length of each of the two units. In this way the inertia components which are not already counteracted by the fact that the two pairs of eccentric shafts and the two units move in opposite directions are very small and the vibrations brought about by them are very slight.

With such a slight eccentricity of the eccentric shafts a correspondingly high operating speed of the machine has thus become possible. Hand in hand with this however, is the need to create a correspondingly capable device for the feeding and removal of the sheets. The embodiment of the machine in accordance with the invention, which is described below, is equipped with such a device. In this connection, it is particularly worthy of note that it is possible to maintain the sheets in motion during the cutting and/or creasing operation and to do so at a speed which corrsponds precisely to that of the two units. In other words, the speed of these units and the speed of rotation of the eccentric shafts is uniform. This not only makes possible a simple drive, but also a further increase in the capacity, since the sheets are cut or creased on the move.

These and other objects of the invention will become apparent from the following description of the invention.

An example embodiment of the invention is shown in the accompanying drawing, in which:

FIG. 1 is an elevation of the machine with the front part of the housing cut away.

FIG. 2 is a cross-section along the line II—II of FIG. 1.

FIG. 3 is a partial cross-section along the line III—III of FIG. 1 on a larger scale.

FIG. 4 is a partial horizontal cross-section which shows certain details of a mechanism serving to drive the sheet transport device.

FIG. 5 is a partial longitudinal section which shows details of the sheet transport device on a larger scale.

FIG. 6 is a horizontal section along the line VI—VI of FIG. 5, and

FIG. 7 is a movement diagram to show the relationship between the movements of the work-holder and the die-block unit and the movements of the sheet transport device and the sheets respectively.

The housing 10 of the machine for the cutting and/or creasing of thin material such as cardboard and metal or plastic foil which is shown in the drawing is of welded construction and as its main parts has a rear-wall central part 11, two rear-wall side parts 12, a front wall central part 13, front wall side parts 14, four beams 15 which connect the parts 11, 13 to each other, two transverse reinforcement plates 16, two beams 17 which connect the parts 11, 13 together on top and two beams 18 each connecting a part 12 with a part 14. There is a removable cover 19.

In the lower part of the housing 10, there is arranged an ordinary drive unit 20. In the drive unit, a slide 25 from which an electric driving motor 26 is suspended is arranged on a threaded spindle 24 which can be turned by a displacement motor 21 by means of a gearing 22, 23. The shaft of the electric motor, carries a variable V-pulley 27 of a V-belt speed variator, the V-belt of which is designated 28 and the other pulley 29 which is mounted on a shaft 30 supported on the housing parts 11, 13. A handwheel 31 can be connected to said shaft.

Four eccentric shafts 32, 33, 34, 35 which extend in a transverse direction and are located alongside or above and parallel to each other, are rotatably mounted by means of roller bearings 36 in the housing parts 11, 13. On the eccentric parts of the two upper eccentric shafts 32, 33, which are located directly alongside of these roller bearings, there is rotatably supported by means of needle bearings 37 the body 38 of a tool holder unit 39. On the corresponding parts of the two lower eccentric shafts 34, 35 the body 40 of a die-block unit 41 is rotatably supported by means of similar needle bearings 37.

On the rear end of the shaft 30, there is keyed a pinion 42 which meshes with a gear 43. The latter, as well as a pinion 44, is keyed onto a countershaft 45 supported in the housing parts 11, 13. The pinion 44 engages with two gears 46, 47 of equal size, one of which is keyed on the eccentric shaft 34 and meshes also with the gear 48 of the same size keyed on the eccentric shaft 32, while the other gear is keyed on the eccentric shaft 35 and meshes with the gear 49 of the same size keyed onto the eccentric shaft 33. The units 39 and 41 therefore carry out translatory, circular movements at the same speed but in opposite directions, in which connection they move towards and away from each other in vertical direction.

To the horizontal lower side of the body 38, there is fastened in replaceable manner, the punching and/or embossing tool 50. In FIG. 3, there is shown a punching tool of known construction with knives 52 inserted in slots of a wooden plate 51. The tool 50 is clamped fast in detachable manner against a hardened steel plate 53. Means for holding and adjusting the tool 50 are schematically shown in FIG. 1. They comprise four vertical rods 54 which are supported on the body 38 and are pulled upward by strong springs 55 and engage below the tool 50 by means of fingers 66 fastened to their lower end. In order to loosen the tool 50, an eccentric shaft 57 supported on the top of the body 38 can be actuated from the outside, said shaft when actuated, knocking the rods 54 downward by means of four toggle levers 58 supported on top of the body 38. The tool 50 which is thus released, can be removed or inserted through a suitably wide opening 59 (FIG. 3) in the housing part 13. The adjustment of the work tool 50 in forward and rearward direction can be effected on both sides independently of each other by actuating a shaft 60 which by way of a helical gearing 61 turns the corresponding rods 54 and displaces fingers 56 in the direction of travel. In the case of the die-block unit 41, there is arranged on the top of the body 40 a wedge plate 63 which can be displaced forward and backward by a device 62 and is held laterally by fingers 66 screwed to the body 40, while over said wedge plate there is arranged a die-block plate 65 provided with a hardened steel plate 64. The plate is secured by the fingers 56 against displacement towards either side and forward and backward and can accordingly be adjusted vertically by displacing the wedge plate 63 with respect to the body 40 so that upon operation, the cutting edges of the knives 52 move forward just to the surface of the steel plate 64.

In the case of the machine shown in the drawing, the sheets which are to be worked (i.e., to be punched and/or embossed) are arranged on the left (FIG. 1) in a pile 67 and the worked sheets are arranged on the right in a pile 68. The piles are supported by movable brackets 69 which are guided on pairs of columns 70, the ends of which are fastened by flanges 71 to the housing parts 11, 13. The drive of the bracket 69 is indicated by chains 72, which are driven by electric motors, and is controlled in such a manner in such a way that the sheet which is at any time at the top of each pile is at a predetermined height. A feeder (not shown) in synchronism with the units 39, 41 lifts the front (in FIG. 1, the right-hand edge) of the topmost sheet of the pile 67 and moves this sheet forward somewhat (toward the right in FIG. 1) so as to deliver it to a conveyor device which will now be described.

The conveyor device has two endless chains 73 which are arranged at the front and at the rear, and each of which travels over a drive sprocket wheel 74, a chain-tensioning wheel 75 and two guide wheels 76 and 77. The two drive sprocket wheels 74 are secured on a shaft 105 which is supported by ball bearings 78 in housing parts 11, 13. On the two chains 73 the two ends of five rails 80 are fastened at regular intervals which correspond to the path traversed by each sheet from the place of removal to the right-hand end (in FIG. 1) of the units 39, 41. As can be noted in detail from FIGS. 5 and 6, on each of these rails 80, distributed over their length, there are fastened a plurality of gripper elements 81, each consisting of a leaf spring and each being associated with a shorter leaf spring 82. For the fastening there is employed a flat iron bar 84 screwed to the rail in question at the points 83. The free end of each gripper spring 81 lies over a corresponding projection 88 of the rail 80 and the central part of each gripper spring lies over a pusher 85, consisting of a ball which is supported for upward and downward displacement in a borehole 86 of the rail 80 which borehole is constricted at its lower end. On the path from the tensioning reels 75 past guide wheels 77, 76 up to the sheet removal point, the free ends of the gripper springs rest against the projections 80a with the pushers 85 extending out of the other side of the rails 80. At the place of removal the gripper springs 81 are raised for a short time by the means described below, so that the aforementioned feed apparatus can insert a sheet. The front end of the sheet in the direction of advance remains held fast until arriving at the chain sprocket wheels 75 where the pushers 85 strike against a stationary rail 87 and lift the gripper springs 81. The sheet which is thus released strikes via a front edge as seen in the direction of travel against the stationary rail 88 so as to place itself on the pile 68.

The means provided at the removal place for raising the gripper springs 81 have two beams 89, 90 which extend in a transverse direction and are supported at their ends by means of rods 91 and buffer springs 92 resiliently on jibs 93 which are fastened to the bodies 38 and 40 respectively. On the lower side of the beam 89 there are fastened blocks 94 of plastic which serve as abutments for the rail 80 whenever the beam 90 presses against the pusher 85 by means of the steel plates 95 welded onto said beam.

The rods 91 welded at one end to the beams 89 and 90 respectively bear at their other end a nut 96 and a locknut 97. If one bears in mind that the jibs 93 carry out a motion of translation with the bodies 38, 40 on stationary circular paths, it becomes clear that by displacing these nuts and lock-nuts, the lifting time of the gripper springs 81 calculated in degrees of rotation of the eccentric shafts 32–35 can be varied, namely lengthened by displacing the two beams 89, 90 toward each other and vice versa.

On the rear side of the beam, as seen in the direction of travel of the sheets, there are welded a plurality of stop plates 98 consisting of steel sheet, against which, upon the insertion of a sheet, the front end of the sheet strikes for registration in the direction of advance. Lateral registering is effected in the manner that the sheets are held in the pile 67 and in particular upon delivery to the transporting device, by the feeding apparatus with their left-side edge against the rail 99. It is thus possible, without additional adjustment work, to work also sheets of smaller size than the largest size corresponding to the dimensions of the plates 51, 65. The supporting of the units 39, 41 on the housing by means of the strong eccentric shafts is so strong and precise that the precision of the work is not impaired when sheets of a smaller format are worked in the front left-hand corner, and the bearings of the eccentric shafts are subjected to unequal force.

It can be noted particularly easily from FIG. 1 that the eccentricity of the eccentric shafts 32–35 is rather small and that the inertia forces are correspondingly small. The (vertical) components directed against each other must, to be sure, be taken up by the housing, but they need not be transmitted to the outside of the housing (for which reason in order to compensate for the weakening of the housing part 13 caused by the opening 59, a plate 100 is welded to said housing part on both sides of the opening). The perimeter of the eccentric circle (i.e. $2\pi x$ the eccentricity) amounts to only a fraction of the length of the two units 39, 41. Each sheet must however move over a much greater path from the place of removal up to the punching and/or embossing place, which distance is equal to the distance between two consecutive rails 80. It must furthermore move entirely synchronously with the two units 39, 41 at the time of embossing or punching. Since therefore, in order to cope with the large path which has just been mentioned, each sheet must be transported with a much greater average speed than it has upon the transfer thereof to the transporting device and at the time of embossing or punching, it or the transporting device must first be strongly accelerated upon each cycle, and finally strongly decelerated.

The drive of the transport device is effected by the drive unit which operates at uniform speed. It is derived from the rear extension 32a of the eccentric shaft 32 and is transmitted by an ordinary sprocket drive 101, 102, 103 and a special mechanism 104 (FIGS. 1, 2 and 4) to the shaft 105, on which the two sprocket drive wheels 74 of the transport device are keyed.

In the mechanism 104, the sprocket wheel 103 and a disk 107 which is connected with it for rotation by a pin 106, are supported in a loosely rotatable manner on a tapered extension 105a of the shaft 105. The driven member 108 keyed on the shaft 105 has a lug 108a on which a swinging arm 110 is supported by means of a bearing pin 109 which is parallel to the shaft 105. The arm 110 carries at its free end on one side a roller 111 which can move back and forth in an approximately radial slot 112 of the disk 107, and on the other side a roller 113 which can move in a groove 114 which is circular but eccentric with respect to the shaft 105, of a plate 115 which is welded to the housing part 11.

FIGS. 1 and 2 show the parts of the mechanism in the position which they assume at the time of punching or embossing. Upon further rotation of the disk 107 in counter-clockwise direction (FIG. 1), the swinging arm 110 is swung outward corresponding to the course of the groove 114 guiding the roller 113 and thus the acute angle between this swinging arm 110 and the lug 108a is opened, and the rotation of the mechanism member 108 accelerated. This continues until the disk 107 (and thus also the eccentric shaft) has made a half revolution (position shown in FIG. 4). From then on, during a further half revolution of the disk 107, the swinging arm 110 is swung inward and the rotation of the mechanism member 108 is thereby decelerated.

The course of movement of any of the gripper rails 80 of the transport device is shown in FIG. 7 in which the relative sizes are undistorted. The eccentric circle, for instance, of the eccentric shaft 32 is subdivided into twelve equal sections. The vertical dashed lines show the positions corresponding to the successive positions of rotation (0 ... 3 ... 6 ... 9 ... 12≡0) of one of the rails 108 on its path from the removal point (position 0) to the cutting or creasing place (position 12). The ordinates of the curves drawn in over this path show the corresponding stroke of the units 39 and 41 respectively. When viewing the curves, it should not be forgotten that the units 39, 41 also have a horizontal component of movement which can be derived from the eccentric circles. It is easy to see that upon movement from position 0 to position 1 and from position 11 to position 12≡0, it is practically the same as the path moved over by the disk 108 (and by the sheet). At the time of the transfer and at the time of cutting or creasing, the tool holder unit 39, the die-block unit 41 and the sheet actually move in precise synchronism, as is absolutely necessary in order to obtain dependable work. However, it is extremely remarkable that the speed of transportation of the sheet at the time of cutting or creasing is not reduced to zero but only to the speed of the tool-holder unit and of the die-block unit. It should furthermore be noted that due to the fact that these two units are moved, the angle of rotation of the eccentric shafts during the cutting and/or creasing period is smaller than if only one of these units were moved by a crank mechanism, as is the case in the known machines. This results in a lesser irregularity of the travel.

Finally it should also be pointed out that following the embossing or the punching, the sheet, starting from its front edge, which moves further horizontally with the rail 80, and proceeding toward the rear is lifted off from the die-block plate which is moving under it.

As various changes may be made in the form, construction and arrangement of the parts herein without departing from the spirit and scope of the invention without sacrificing any of its advantages, it is to be understood that all matter herein is to be interpreted as illustrative and not in a limiting sense.

What is claimed as new:

1. A machine for selectively cutting and creasing individual sheets of thin material one at a time comprising a frame, a tool holder unit and a die-block unit, a pair of eccentric shafts for each of said units, means rotatably mounting said eccentric shafts in said frame, means mounting each of said units on a respective pair of said shafts, drive means for driving said eccentric shafts in opposite directions for moving said units in opposite directions into positions toward and away from each other, conveying means for moving individual sheets from a stacked pile between said units and then to a finished pile, bracket means adjacent one side of said frame for stacking a pile of sheets thereon to be supplied to said conveying means, other bracket means adjacent the other side of said frame for receiving finished sheets from said conveyor means, conveyor drive means operatively connected to said conveyor means for continuously driving said conveying means during the rotation of said eccentric shafts so the speed of said conveying means is at a minimum when said units are in said position towards each other and at a maximum speed when said units are in said position away from each other, said conveying means being in the form of an endless conveyor having spaced sheet gripping means thereon for pulling individual sheets, said units having sheet engaging surfaces corresponding in size generally to sheets to be operated on by said units, and said conveyor drive means driving said endless conveyor a distance equal to the spacing of said sheet gripping means whereby a sheet is presented to said units for each cycle of operation of said units.

2. A machine for selectively cutting and creasing individual sheets of thin material one at a time comprising a frame, a tool holder unit and a die-block unit, a pair of eccentric shafts for each of said units, means rotatably mounting said eccentric shafts in said frame, means mounting each of said units on a respective pair of said shafts, drive means for driving said eccentric shafts in opposite directions moving said units in opposite directions into positions toward and away from each other, conveying means for moving individual sheets from a stacked supply pile and between said units and then to a finished pile, conveyor drive means operatively connected to said conveyor means for continuously driving said conveying means during the rotation of said eccentric shafts so the speed of said conveying means is at a minimum speed when said units are in said opposed position towards each other and at a maximum speed when said units are in said position away from each other, said conveying means being in the form of an endless conveyor having spaced sheet gripping means thereon for pulling individual sheets, and means engageable with said sheet gripping means at sheet receiving and sheet releasing positions along the path of said conveyor and on opposite sides of said units.

3. A machine for selectively cutting and creasing individual sheets of thin material one at a time comprising a frame, a tool holder unit and a die-block unit, a pair of eccentric shafts for each of said units, means rotatably mounting said eccentric shafts in said frame, means mounting each of said units on a respective pair of said shafts, drive means for driving said eccentric shafts in opposite directions for moving said units in opposite directions in positions towards and away from each other, conveying means for moving sheets from a stacked supply pile and between said units to a finished pile, conveyor drive means operatively connected to said conveyor means for continuously driving said conveying means during the rotation of said eccentric shafts so the speed of said conveying means is at a minimum speed when said units are in said position towards each other and at a maximum speed when said units are in said position away from each other, said conveying means being in the form of an endless conveyor having spaced sheet gripping means thereon, said sheet gripping means each including a transverse gripping bar for pulling individual sheets, a plurality of spring fingers spaced along said gripping bar, and spring finger lifters seated in said gripper bar below said spring fingers, said lifter projecting through said gripper bar for engagement by longitudinally fixed actuator means.

4. A machine for selectively cutting and creasing individual sheets of thin material one at a time comprising a frame, a tool holder unit and a die-block unit, a pair of eccentric shafts for each of said units, means rotatably mounting said eccentric shafts in said frame, means mounting each of said units on a respective pair of said shafts, drive means for driving said eccentric shafts in opposite directions for moving said units in opposite directions into positions toward and away from each other, conveying means for moving individual sheets from a stacked pile between said units and then to a finished pile, bracket means on opposite sides of said frame for holding a supply of sheets thereon and to receive a finished pile of sheets thereon, conveyor drive means operatively connected to said conveying means for continuously driving said conveying means during the rotation of said eccentric shafts so the speed of said conveying means is at a minimum speed when said units are in said position towards each other and at a maximum speed when said units are in said position away from each other, said conveying means being in the form of an endless conveyor having spaced sheet gripping means thereon for pulling individual sheets, said sheet gripping means each including a transverse gripping bar, a plurality of spring fingers spaced along said gripping bar, and spring finger lifters seated in said gripper bar below said spring fingers, said lifter projecting through said gripper bar for engagement by longitudinally fixed actuator means, said actuator means including means for positioning a sheet immediately in advance of the gripping thereof by said sheet gripping means to position the sheet relative to said units.

5. A machine for selectively cutting and creasing individual sheets of thin material one at a time comprising a frame, a tool holder unit and a die-block unit, a pair of eccentric shafts for each of said units, means rotatably mounting said eccentric shafts in said frame, means mounting each of said units on a respective pair of said shafts, drive means for driving said eccentric shafts in opposite directions for moving said units in opposite directions into positions towards and away from each other, conveying means for moving sheets from a stacked supply pile between said units to a finished pile, conveyor drive means operatively connected to said conveying means for continuously driving said conveying means during the rotation of said eccentric shafts so the speed of said conveying means is at a minimum speed when said units are in said position towards each other and at a maximum speed when said units are in said position away from each other, and means for supporting sheets in stacks on opposite sides of said units, one of said stacks being a sheet delivery stack and the other of said stacks being a sheet receiving stack, and means for supporting the uppermost sheet of each stack at a constant level.

References Cited by the Examiner

UNITED STATES PATENTS

| | | | |
|---|---|---|---|
| 1,241,257 | 9/17 | Wurts et al. | 83—628 |
| 1,619,214 | 3/27 | Olgay | 83—92 |
| 2,045,046 | 6/36 | Mudd | 83—86 |
| 2,347,254 | 4/44 | Cox | 83—417 |
| 2,385,926 | 10/45 | Linscott | 83—154 |
| 2,541,573 | 2/51 | Conner | 83—628 |
| 2,829,890 | 4/58 | Kury et al. | 271—79 |
| 2,850,280 | 9/58 | Kalbermatten | 271—75 |
| 3,043,177 | 7/62 | Sarka | 83—312 |

ANDREW R. JUHASZ, *Primary Examiner.*

CARL W. TOMLIN, *Examiner.*